(12) United States Patent
Sun et al.

(10) Patent No.: US 11,045,752 B2
(45) Date of Patent: Jun. 29, 2021

(54) MANIFOLD ASSEMBLY AND METHOD OF USE

(71) Applicant: Pall Corporation, Port Washington, NY (US)

(72) Inventors: Peng Sun, Zouping (CN); Kurt E. Brown, Cortland, NY (US)

(73) Assignee: PALL CORPORATION, Port Washington, NY (US)

( * ) Notice: Subject to any disclaimer, the term of this patent is extended or adjusted under 35 U.S.C. 154(b) by 150 days.

(21) Appl. No.: 16/657,182

(22) Filed: Oct. 18, 2019

(65) Prior Publication Data
US 2021/0113945 A1    Apr. 22, 2021

(51) Int. Cl.
*B01D 29/96* (2006.01)
*B01D 35/157* (2006.01)
*B01D 35/30* (2006.01)
*B01D 35/15* (2006.01)

(52) U.S. Cl.
CPC ......... *B01D 29/96* (2013.01); *B01D 35/1573* (2013.01); *B01D 35/30* (2013.01); *B01D 2201/0415* (2013.01); *B01D 2201/4061* (2013.01)

(58) Field of Classification Search
CPC .... B01D 29/96; B01D 35/1573; B01D 35/30; B01D 2201/0415; B01D 2201/4061
See application file for complete search history.

(56) References Cited

U.S. PATENT DOCUMENTS 6,652,749 B2    11/2003 Stankowski et al.

*Primary Examiner* — Waqaas Ali
(74) *Attorney, Agent, or Firm* — Leydig Voit & Mayer, Ltd.

(57) ABSTRACT

A manifold assembly and a method of engaging a filter capsule in the manifold assembly are provided.

6 Claims, 15 Drawing Sheets

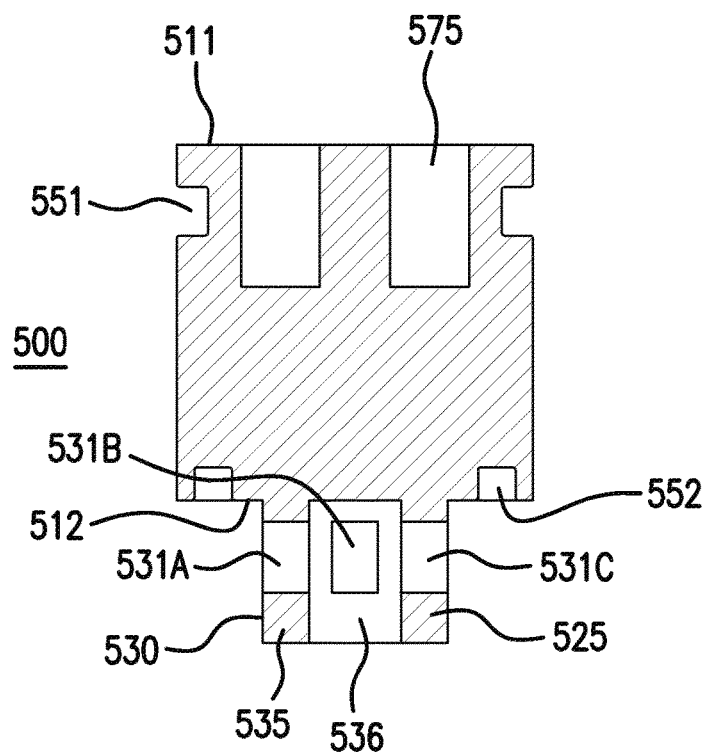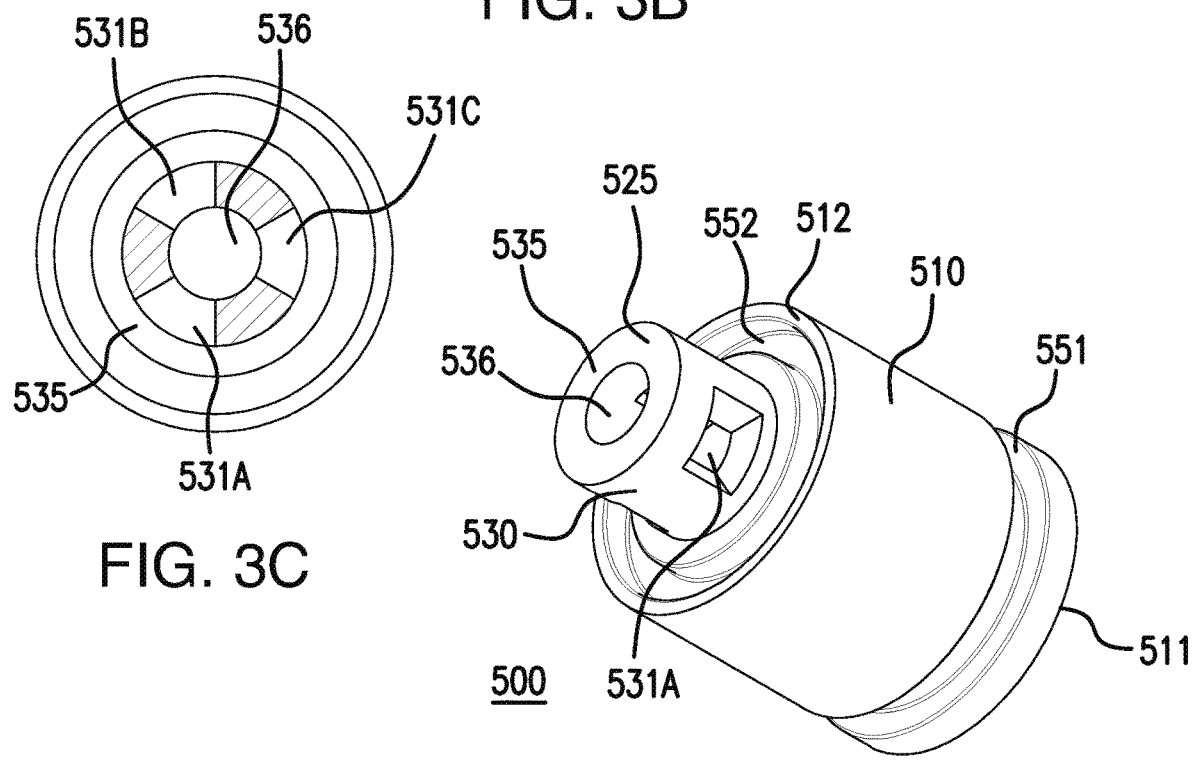

MANIFOLD ASSEMBLY AND METHOD OF USE

BACKGROUND OF THE INVENTION

Manifold assemblies can be used for change-outs of filters. However, there is a need for improved manifold assemblies.

BRIEF SUMMARY OF THE INVENTION

An embodiment of the invention provides a manifold assembly for use with a filter capsule having a first fitting and a second fitting, the manifold assembly comprising (a) an upper adjustable frame arrangement comprising a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end that can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening.

In an embodiment, the rear wall of the upper adjustable frame arrangement comprises a locking pin opening and a cavity for receiving a linear guide comprising a grooved plate, wherein the linear guide is mounted to the block and is arranged to guide the adjustable frame arrangement vertically between the first position and the second position; wherein the upper adjustable frame arrangement is movable along the linear guide between the first and the second positions when the locking pin end is not in the first opening or the second opening.

In another embodiment, a method for engaging a filter capsule in a manifold assembly is provided, the method comprising placing a filter capsule having a first fitting and a second fitting into a manifold assembly comprising (a) an upper adjustable frame arrangement comprising a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end that can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening; placing the second fitting into the through hole of the lower frame arrangement; moving the upper adjustable frame arrangement from the first position to the second position and placing the first fitting in the through hole of the upper adjustable frame arrangement such that the first fitting contacts the check valve and opens the check valve; and moving the movable handle to lock the upper adjustable frame arrangement in the second position.

BRIEF DESCRIPTION OF THE SEVERAL VIEWS OF THE DRAWING(S)

FIGS. 1A, 1B, and 1C are exploded views of a manifold assembly comprising an upper adjustable frame arrangement, a lower frame arrangement, and a manifold frame connected to the frame arrangements according to an embodiment of the invention, wherein FIG. 1A shows an exploded left side view including movable handle on a side wall of the upper adjustable frame arrangement that can lock the upper adjustable frame arrangement is in a first position or a second position, FIG. 1B shows an exploded rear view, and FIG. 1C shows an exploded right side view, including, in a side wall, an end of a through hole allowing a fluid flow path to be provided in the upper adjustable frame arrangement. FIGS. 1A-1C also show upper and lower connection port fittings.

FIG. 2A shows a side view, and FIG. 2B shows a rear view.

FIG. 3A shows a perspective view of an illustrative check valve, FIG. 3B shows a cross-sectional view of the check valve shown in FIG. 3A, and FIG. 3C shows a bottom view of the check valve shown in FIG. 3A.

Figure 4A:
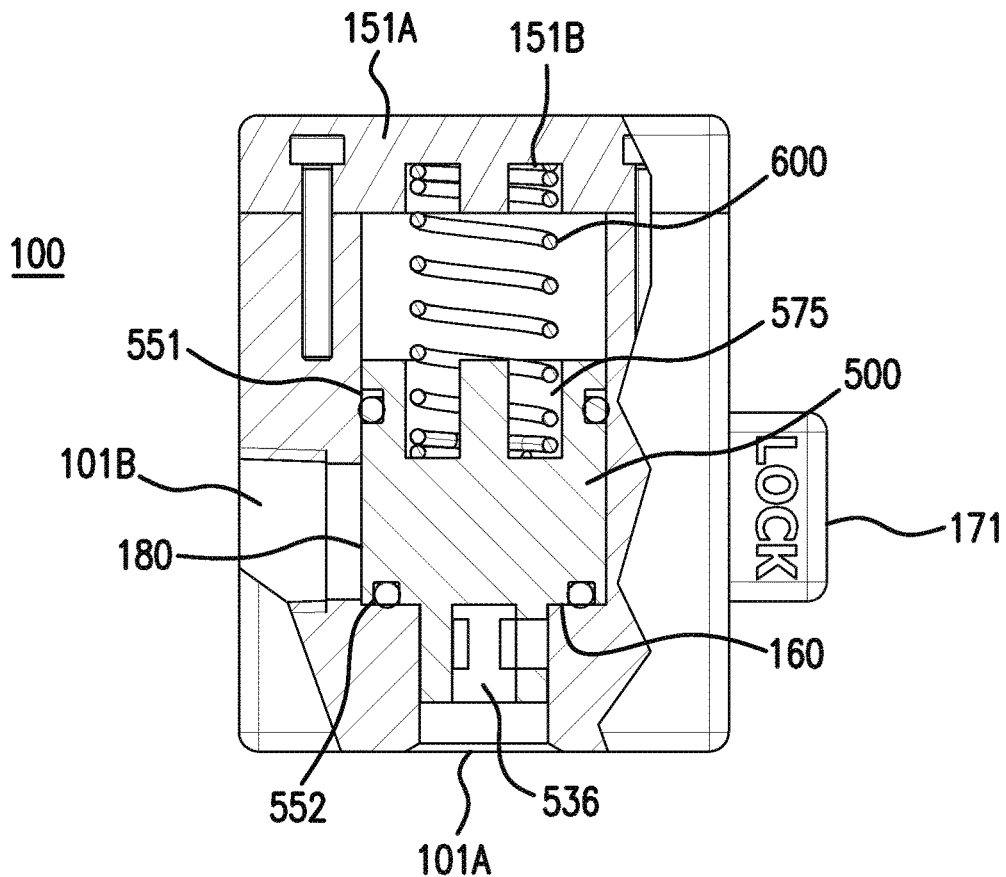
Figure 4B:
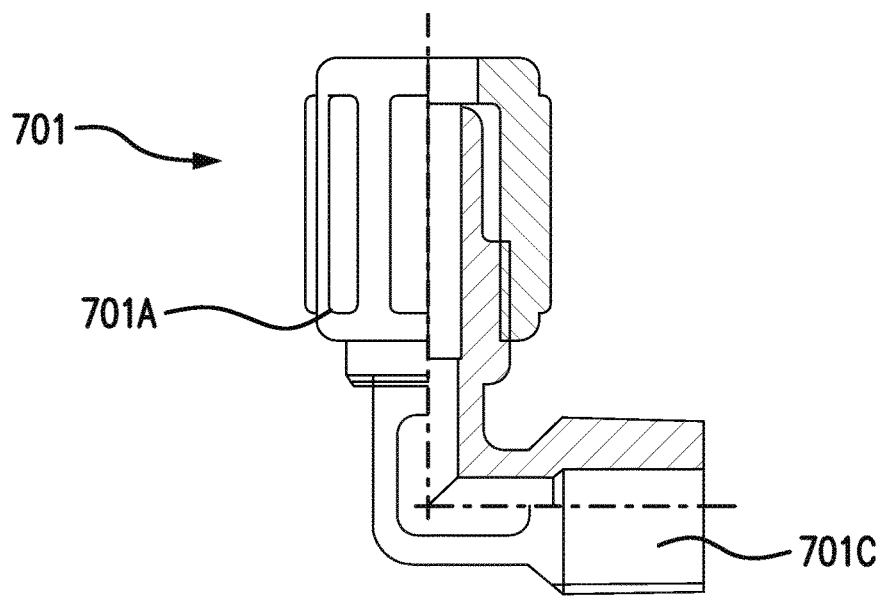
Figure 4C:
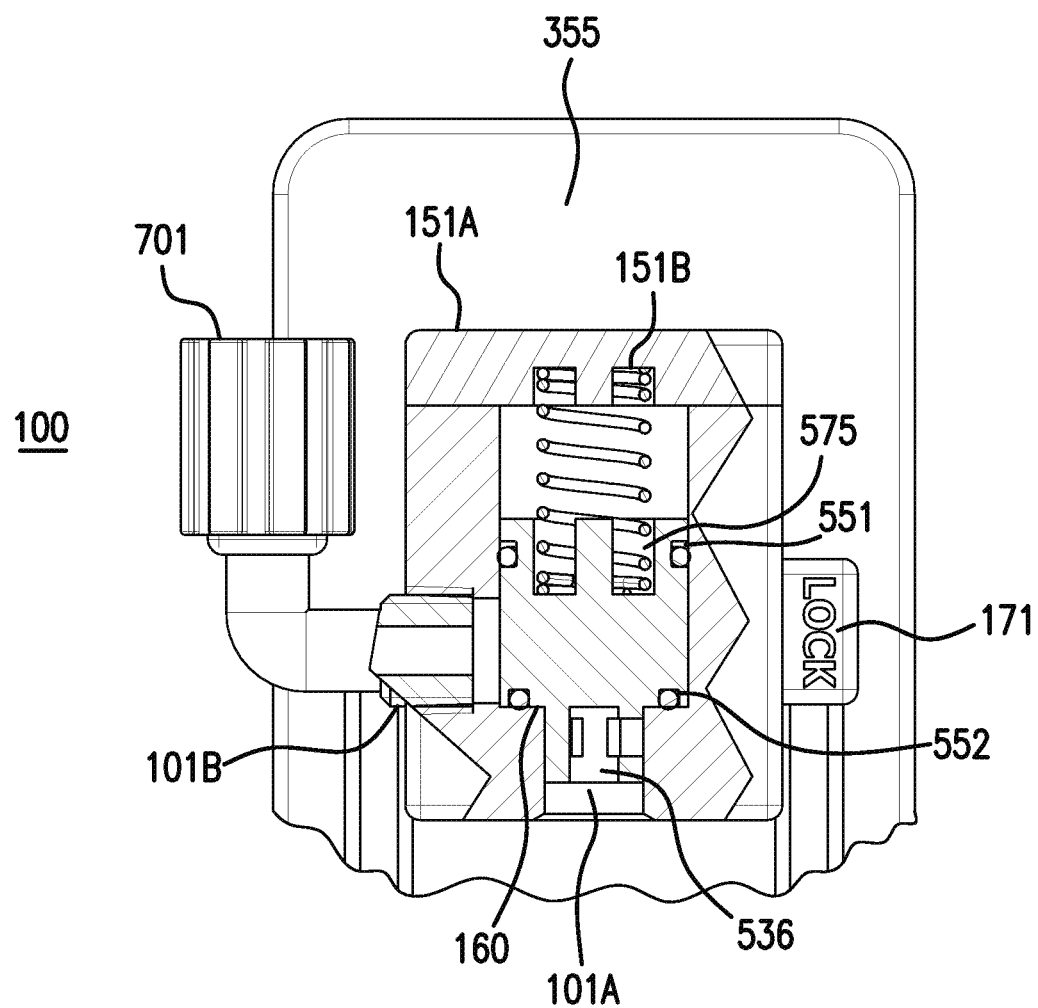

FIG. 4A shows a cross-sectional view of the check valve arranged in a cavity of the upper adjustable frame arrangement, arranged across the fluid flow path, wherein the check valve is biased closed across the fluid flow path. FIG. 4B shows a cross-sectional view of an upper connection port fitting that can be inserted in the side wall of the upper adjustable frame arrangement shown in FIG. 4A. FIG. 4C shows the upper port fitting inserted in the side wall of the upper adjustable frame arrangement, wherein the upper adjustable frame arrangement is connected to the manifold frame.

Figure 5:
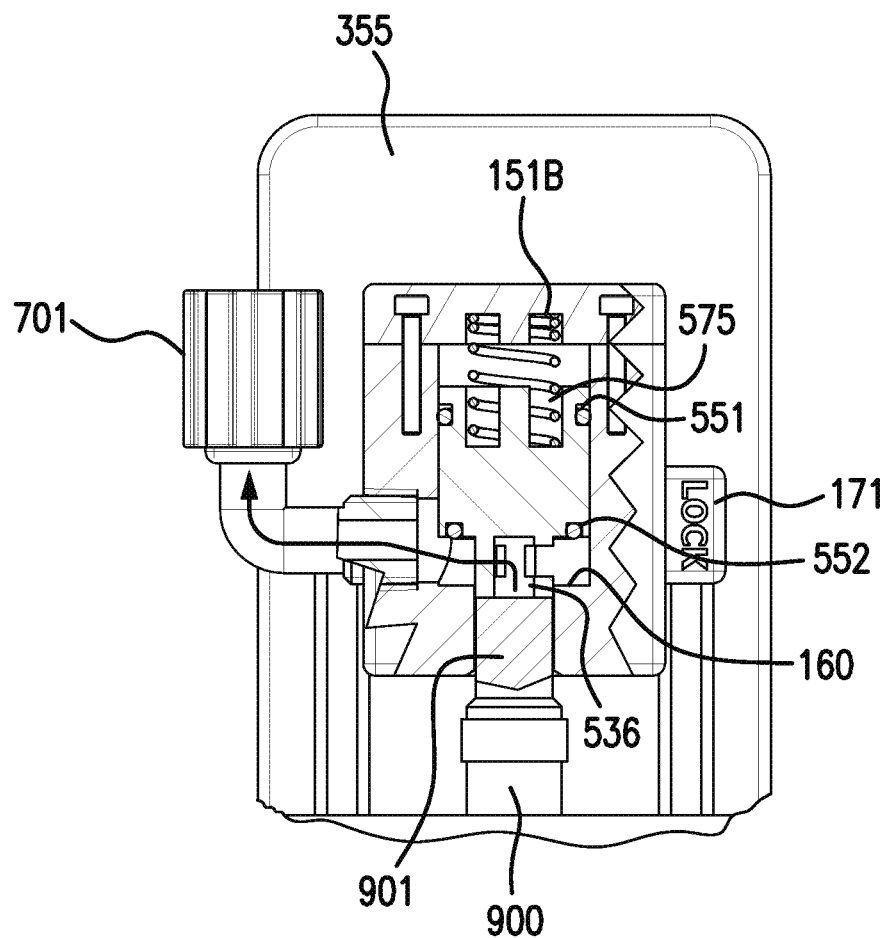

FIG. 5 shows a cross-sectional view of the check valve arranged in a cavity of the upper adjustable frame arrangement, arranged across the fluid flow path, wherein the check valve has been contacted and pushed up by the first fitting of the filter capsule, opening the fluid flow path, wherein the arrow illustrates the fluid flow path.

Figure 1A:
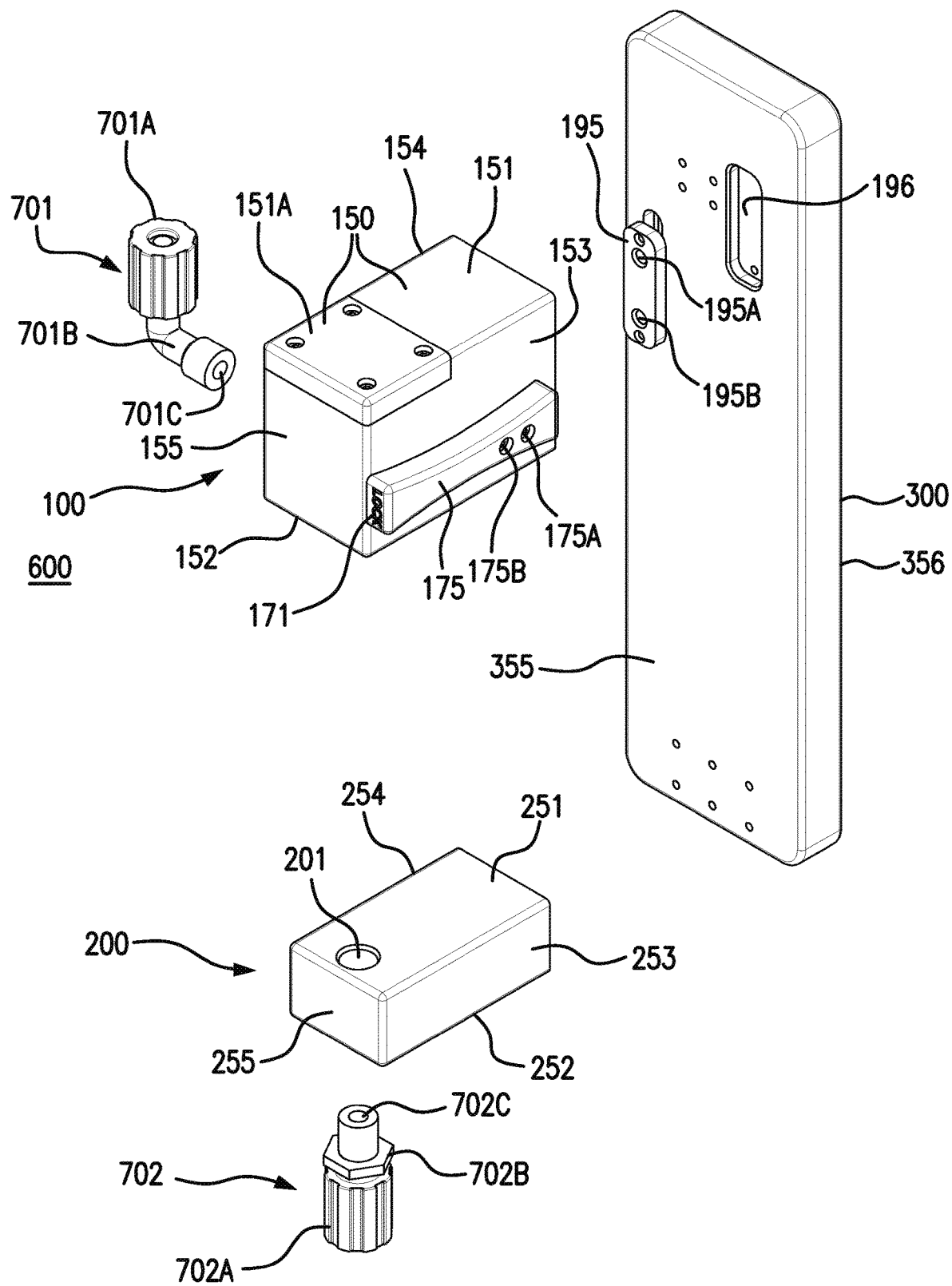
Figure 1B:
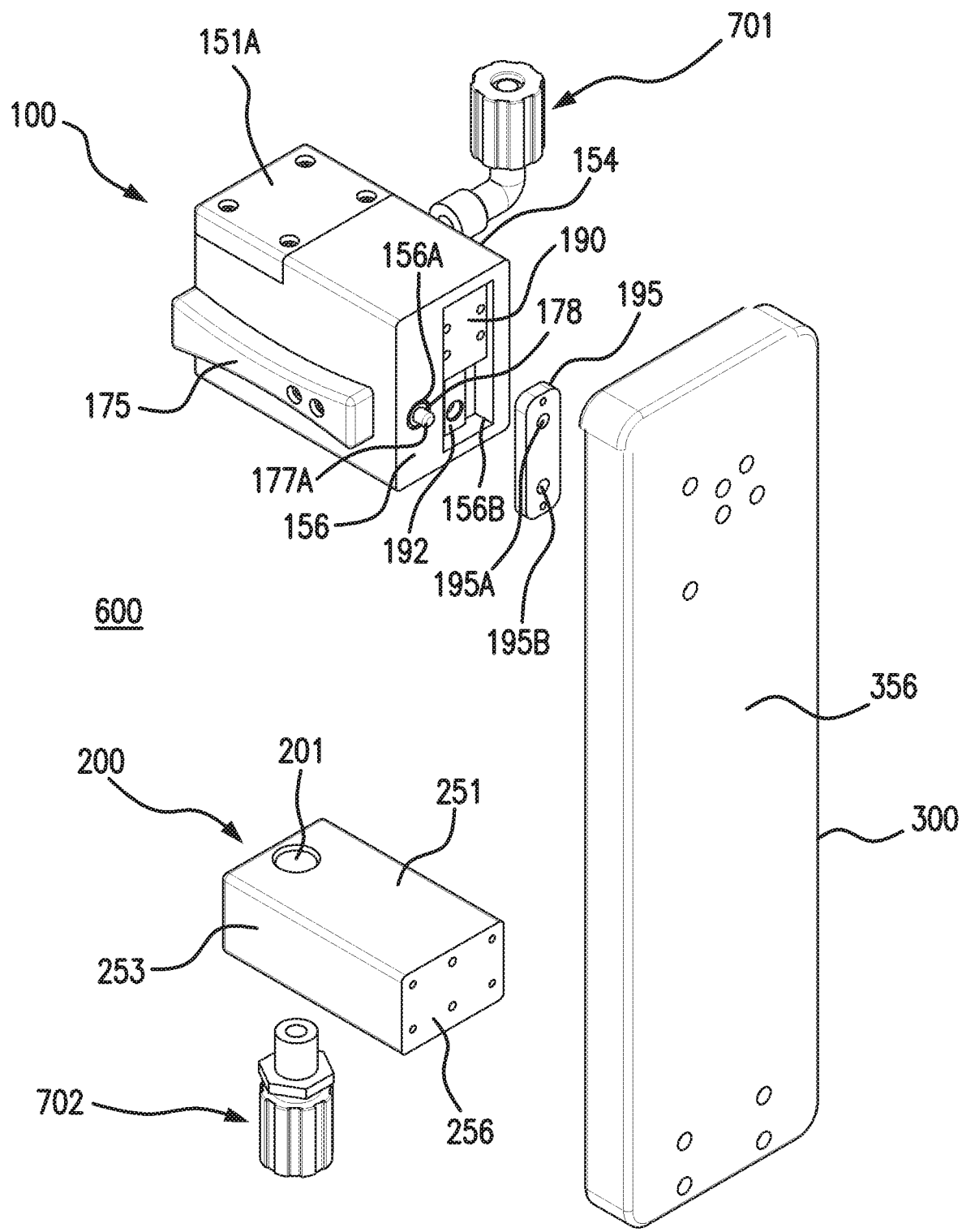
Figure 1C:
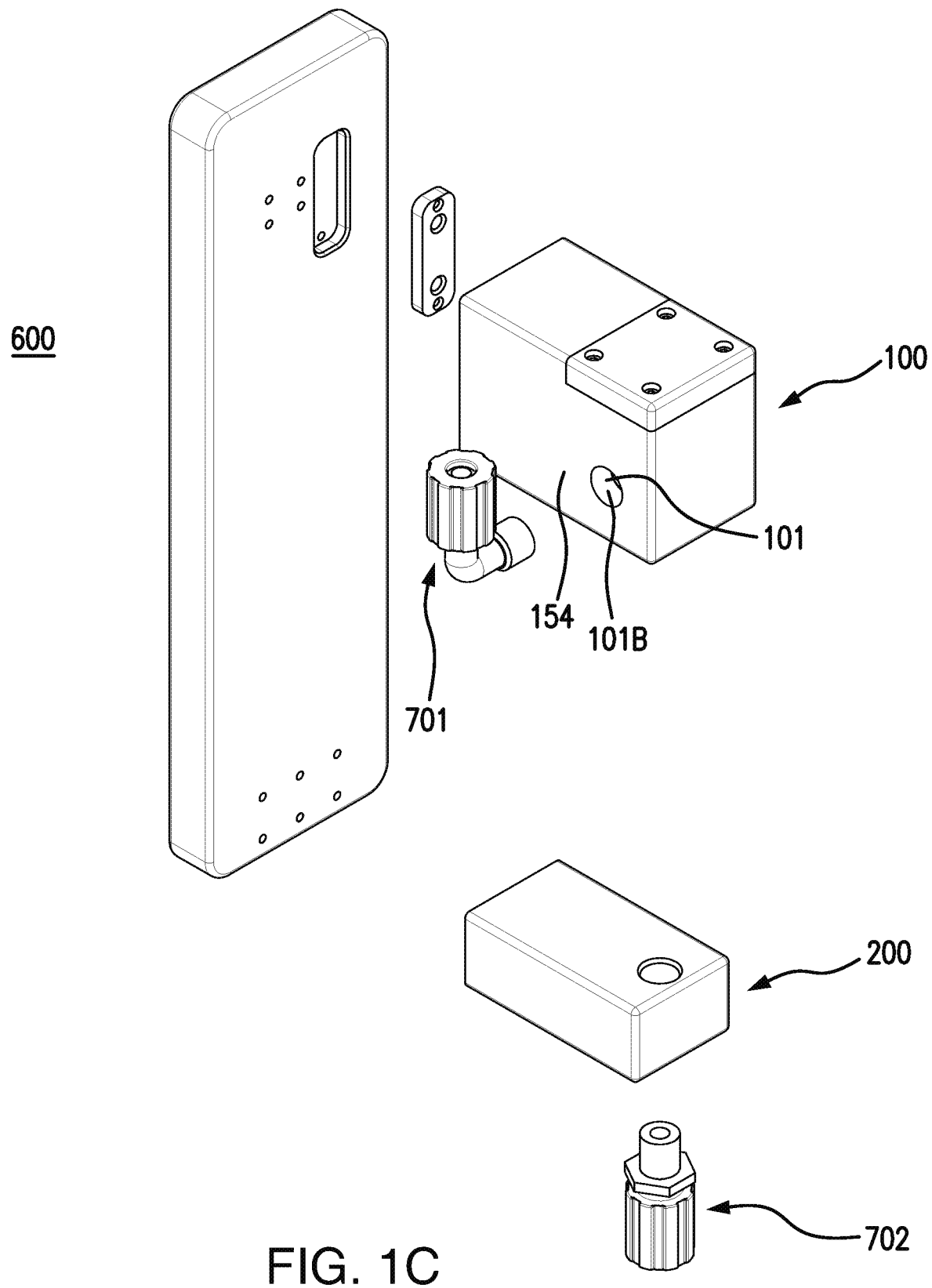
Figure 6A:
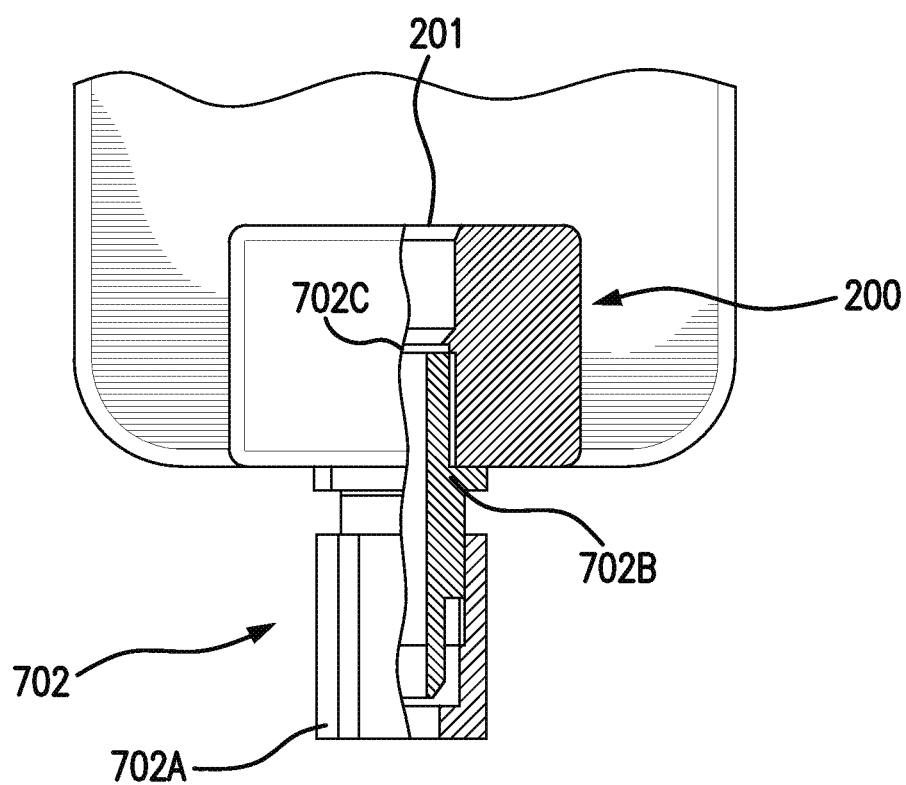
Figure 6B:
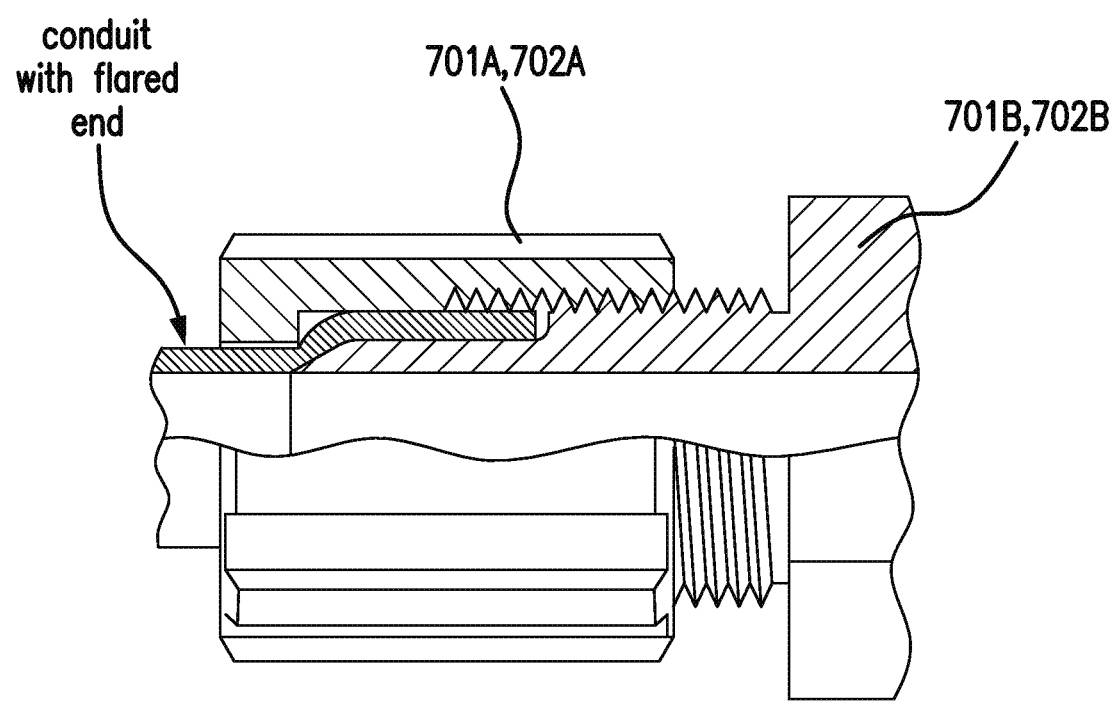

FIG. 6A is a cross-sectional view of the lower frame arrangement in the manifold assembly shown in FIGS. 1A-1C, also showing the lower connection port fitting including a second fluid fitting fluid port, wherein the lower connection port fitting nut is also shown in cross-sectional view. FIG. 6B shows a cross-sectional view of an illustrative connection port fitting connected to the manifold assembly, also including a portion of a conduit passing through the fitting, wherein the conduit is in fluid communication with the manifold assembly.

Figure 7A:
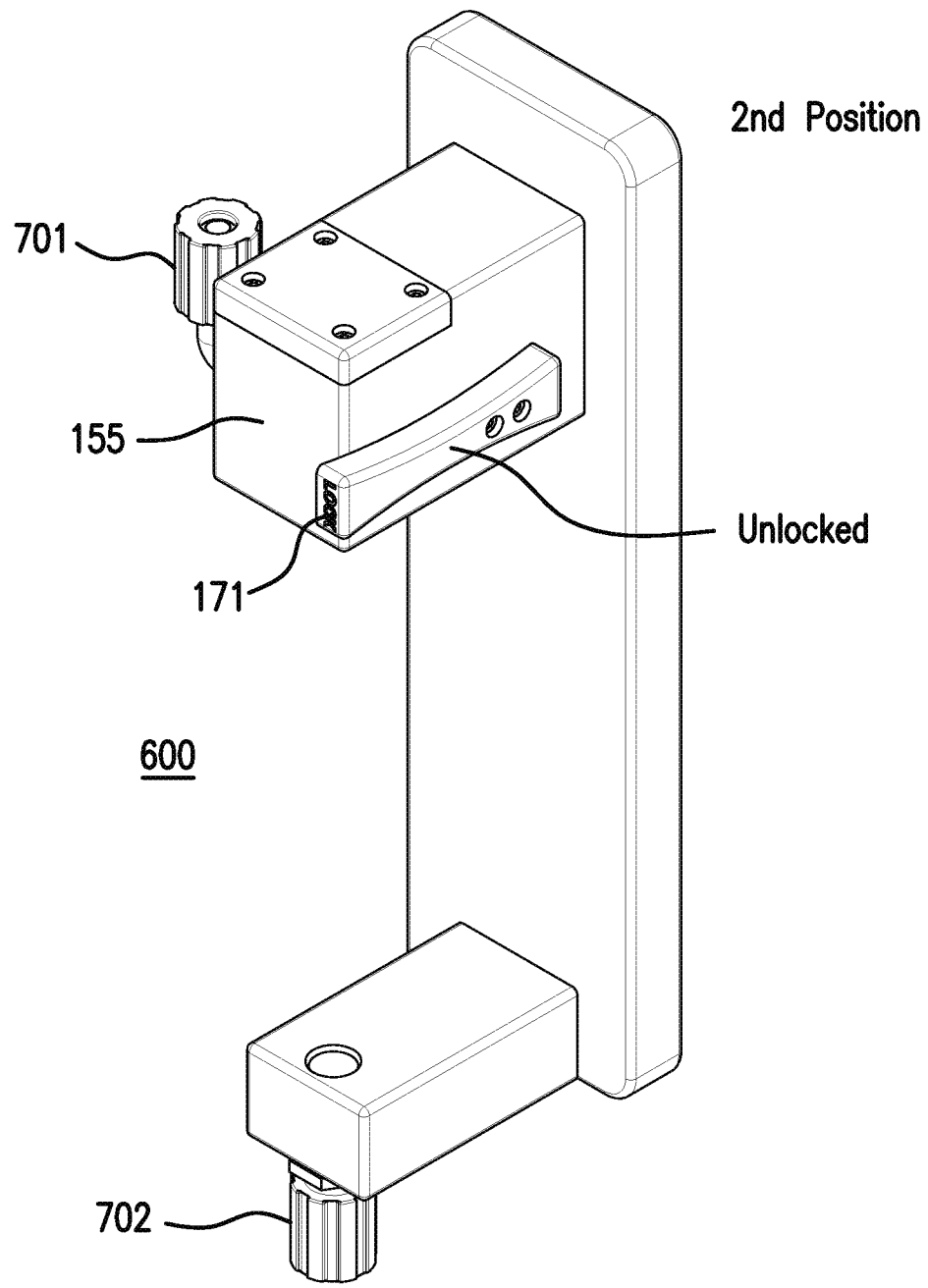

FIG. 7A is a perspective view of a manifold assembly shown in FIGS. 1A-1C, wherein the movable handle has been moved to unlock the upper adjustable frame arrangement, and the upper adjustable frame arrangement is unlocked in the second position.

Figure 7B:
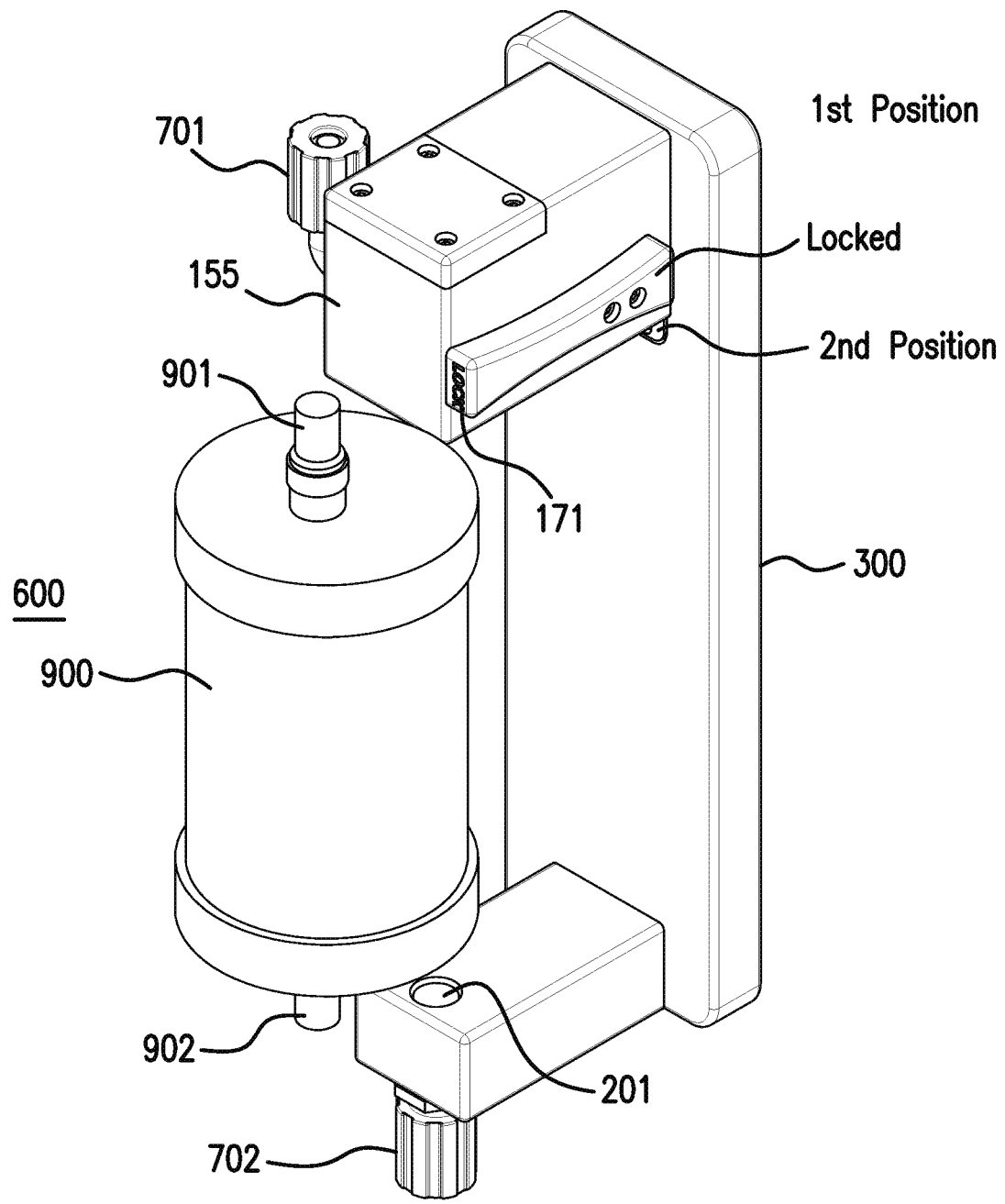

FIG. 7B shows a filter capsule having a first fitting and a second fitting about to be placed in the manifold assembly shown in FIG. 7A, wherein the upper adjustable frame arrangement has been moved vertically and upwardly to the first position, and the movable handle has been moved to lock the upper adjustable frame arrangement in the first position before placing the filter capsule in the manifold assembly.

Figure 7C:
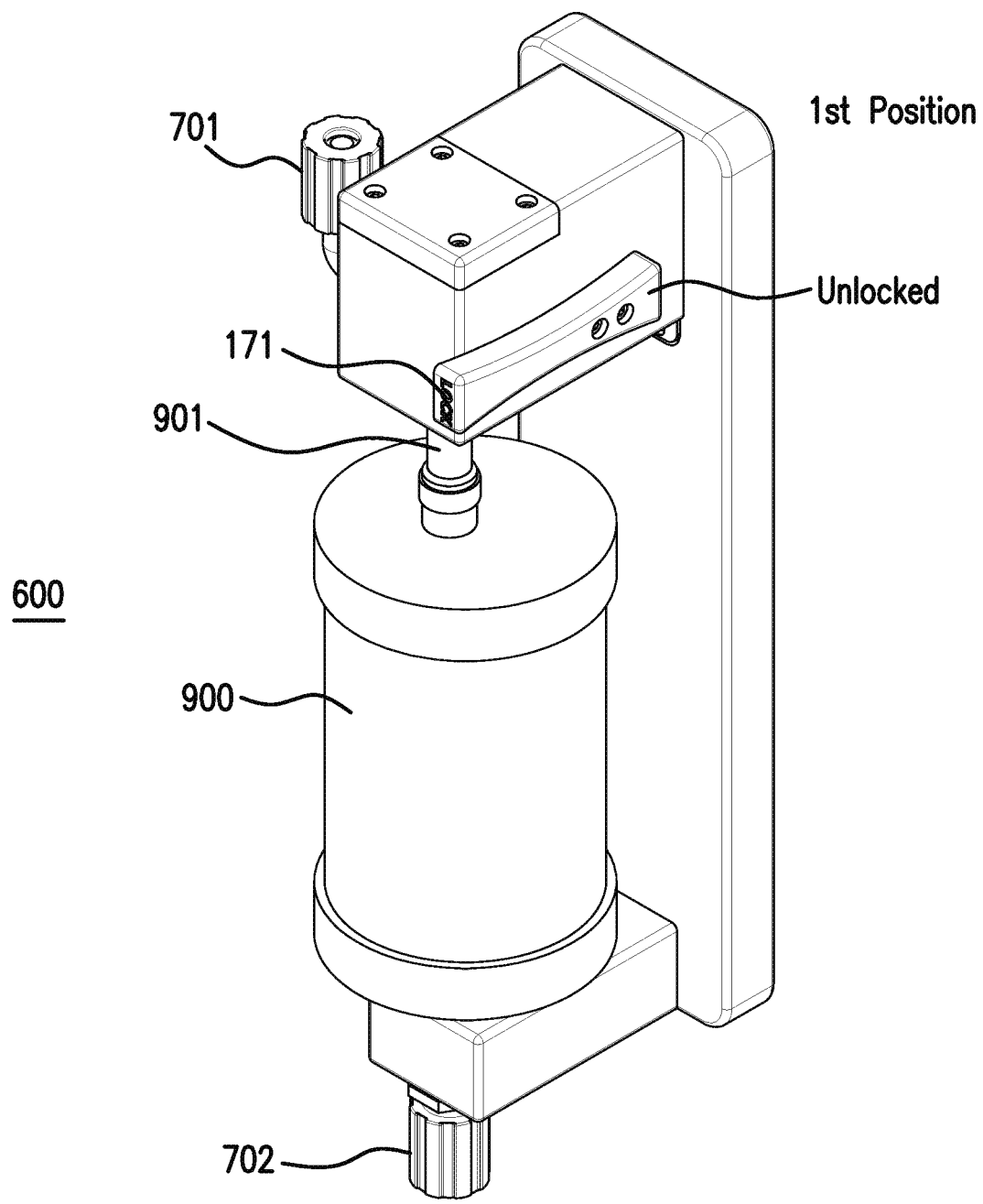

FIG. 7C shows, in side view, that the filter capsule is kept vertically and moved horizontally to be placed in the manifold assembly, wherein the movable handle has been moved to unlock the upper adjustable frame arrangement in the first position, and the second fitting is engaged with the second fitting flow port.

Figure 7D:
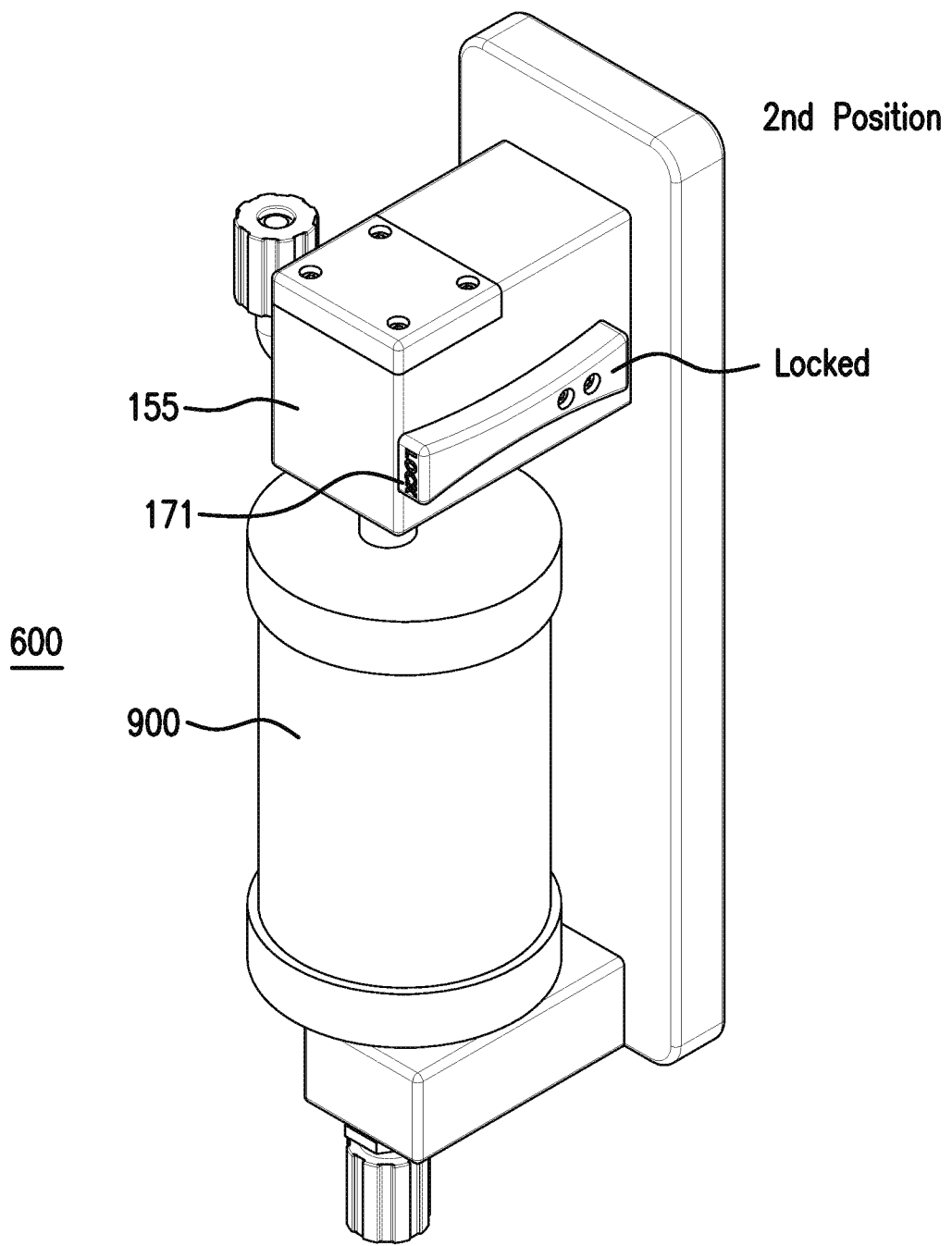

FIG. 7D shows the filter capsule placed in the manifold assembly shown in FIG. 7C, wherein the upper adjustable frame arrangement has been moved vertically and downwardly to the second position, the moveable handle has been moved to lock the upper adjustable frame arrangement in the second position, and the first fitting is engaged with the first fitting flow port and pushes the normally biased closed check valve upwardly to open the fluid flow path, and radial seals are formed between the first fitting and the first fitting flow port, and between the second fitting and the second fitting fluid flow port.

DETAILED DESCRIPTION OF THE INVENTION

In accordance with an embodiment of the invention, a manifold assembly for use with a filter capsule having a first fitting and a second fitting is provided, the manifold assembly comprising (a) an upper adjustable frame arrangement comprising a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end that can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening.

In an embodiment, the rear wall of the upper adjustable frame arrangement comprises a locking pin opening and a cavity for receiving a linear guide comprising a grooved plate, wherein the linear guide is mounted to the block and is arranged to guide the adjustable frame arrangement vertically between the first position and the second position; wherein the upper adjustable frame arrangement is movable along the linear guide between the first and the second positions when the locking pin end is not in the first opening or the second opening.

In another embodiment, a method for engaging a filter capsule in a manifold assembly is provided, the method comprising placing a filter capsule having a first fitting and a second fitting into a manifold assembly comprising (a) an upper adjustable frame arrangement comprising a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end that can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening; placing the second fitting into the through hole of the lower frame arrangement;

moving the upper adjustable frame arrangement from the first position to the second position and placing the first fitting in the through hole of the upper adjustable frame arrangement such that the first fitting contacts the check valve and opens the check valve; and moving the movable handle to lock the upper adjustable frame arrangement in the second position.

Advantageously, filter capsules can be installed in a manifold assembly, readily connected and disconnected, and changed-out quickly in confined spaces. Dripping of fluid from the outlet connection can be minimized or eliminated. Additionally, filter capsules can be installed with an easy motion without individually connecting each filter capsule fitting to the manifold assembly. Moreover, filter capsules can be inserted into the manifold assembly and engaged without rotating the filter capsule.

Embodiments of the invention can be used with a variety of filters and filter capsules, including, for example, those available from Pall Corporation (East Hills, N.Y.). The filter and filter capsules are suitable for filtering a variety of fluids, including, but not limited to, a broad range of slurries and liquids, such as chemical mechanical planarization (CMP) slurries.

Each of the components of the invention will now be described in more detail below, wherein like components have like reference numbers.

As an initial point for ease of reference, FIG. 7B shows a filter capsule 900 having a first fitting 901 and a second fitting 902 being placed in an embodiment of the manifold assembly 600. As will be discussed in more detail below, when the filter capsule is engaged in the manifold assembly, the first fitting 901 contacts a check valve, and opens a fluid flow path.

FIGS. 1A-1C show an embodiment of a manifold assembly 600 comprising an upper adjustable frame arrangement 100 comprising a block 150 comprising a top wall 151 including top cover 151A, that is typically removable (covering the check valve as discussed in more detail below), a bottom wall 152, a first side wall 153 and a second side wall 154, an end 101B of through hole 101 (shown in FIG. 1C, the other end 101A of through hole 101 is shown in FIGS. 4A, 4C, and 5) for receiving the first fitting, the through hole passing through the bottom wall 152 and the side the second side wall 154, a front wall 155, and a rear wall 156, the rear wall including a locking pin opening 156A. In this illustrated embodiment, the rear wall 156 includes a cavity 156B for receiving a linear guide 190 comprising a grooved plate 191 that slides on a rail 192, wherein the linear guide is mounted to the block via rail 192 (wherein the rail is mounted to the block via retainers 193A and 193B such as bolts and/or screws or a press-fit) and is arranged to guide the adjustable frame arrangement vertically between a first position and a second position; a slidable handle 175 arranged on the first side wall, the slidable handle having a front wall or face 171; a slot 176 in the first side wall; a slidable locking pin 177 arranged in the block, the slidable locking pin having an end 177A, wherein the slidable locking pin can be withdrawn into the block and extended from the block through the locking pin opening 156A upon slidably moving the handle horizontally, wherein the slidable handle is connected to the slidable locking pin by at least one retainer (two retainers 175A and 175B such as bolts and/or screws (or a press-fit) connected to locking pin 177 at openings 175C and 175D are shown) passing through the slot in the first side wall, wherein the slidable handle can move the slidable locking pin to slide the locking pin end into a first opening 195A to lock the upper adjustable frame arrangement in the first position, and to slide the locking pin end into a second opening 195B to lock the adjustable frame arrangement in the second position, wherein the upper adjustable frame arrangement is movable along the linear guide between the first and the second positions when the locking pin end is not in the first opening or the second opening; (b) a lower frame arrangement 200 comprising a through hole 201 for receiving the second fitting; and (c) a manifold frame 300 connected to the upper adjustable frame arrangement and connected the lower frame arrangement, the manifold frame including the first opening and the second opening.

FIGS. 1A-1C also show an upper connection port fitting 701 and a lower connection port fitting 702.

Figure 2A:
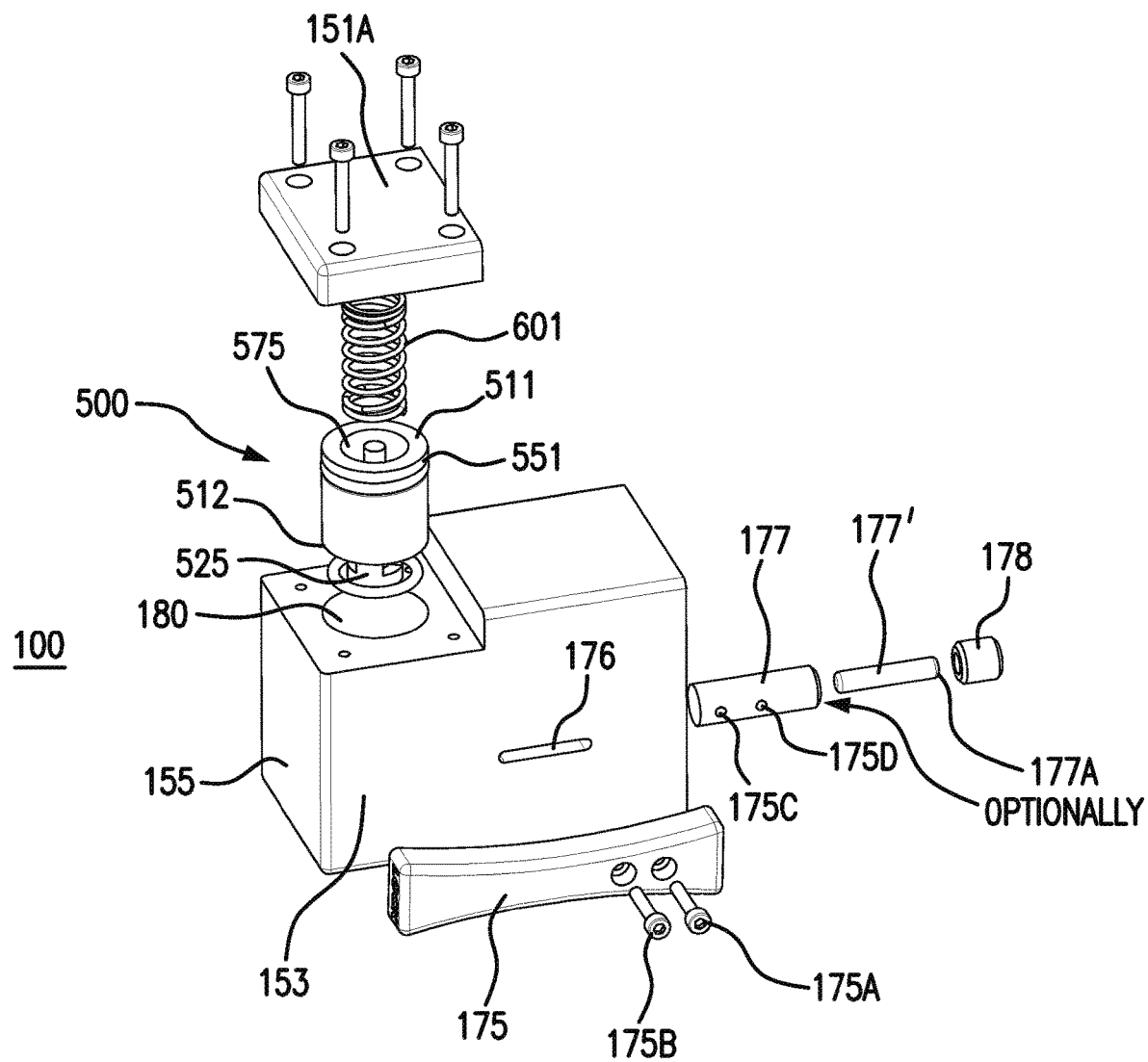
FIGS. 2A and 2B show exploded views of an illustrative upper adjustable frame arrangement including a check valve.
Figure 2B:
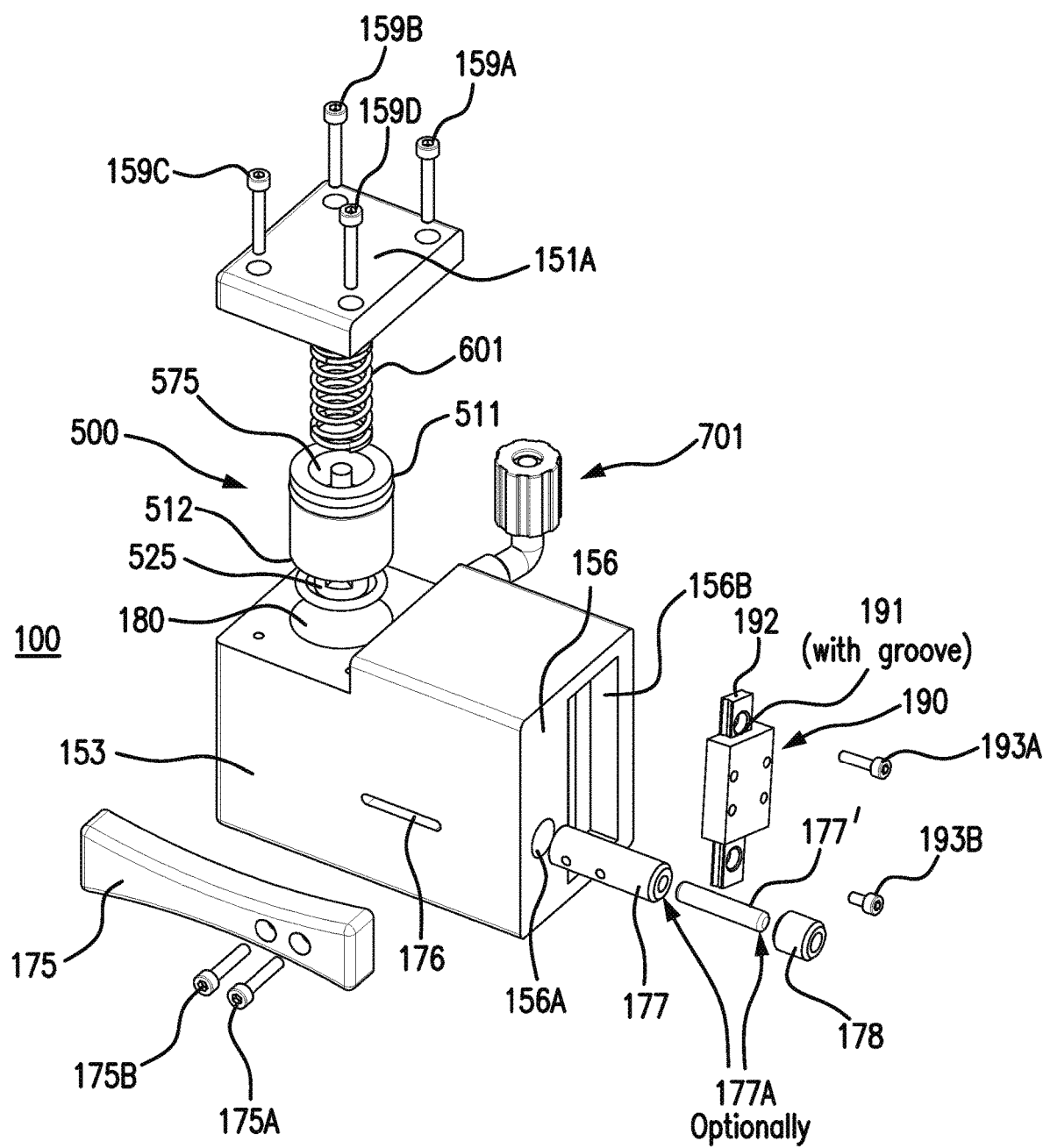

FIGS. 2A and 2B show an exploded view of the upper adjustable frame arrangement 100 wherein the block 150 includes a cavity 180 for receiving a check valve 500, wherein FIGS. 3A-3C, 4A, 4B, and 5 show an illustrative check valve. The illustrated check valve 500 includes a body having an upper end 511 and a lower end 512 and a projection or valve stem 525 extending from the lower end, the projection having a side wall 530 including slots 531A, 531B, 531C, and a bottom end 535 having a central opening 536, and an open area between, and communicating with, the slots and the central opening, and a spring 600 is in contact with the top end of the body. Preferably, as shown in FIGS. 2A-2B, 3A, 3B, 4A, 4C, and 5, the body includes upper and lower grooves for receiving o-rings (shown in FIGS. 4A, 4C, and 5) for sealing the check valve in the cavity. As shown in particular in FIGS. 4A, and 4C, the upper end of the body includes an annular groove projecting downwardly 575, for receiving the lower end of a spring 600, wherein the upper end of the spring is retained, with tension to bias the valve closed, by a groove 151B in the lower surface of the top cover 151A connected to the upper adjustable frame arrangement. As shown in FIGS. 4A and 4C, when the valve is closed, the lower end 512 of the body contacts the lower end of the cavity in the upper adjustable frame arrangement (the lower end of the cavity providing a valve seat 160) and the projection 525 is located in the portion of the fluid flow path near the opening of the through hole in the bottom wall of the upper adjustable frame arrangement.

As shown in FIG. 5 (see, also, FIG. 7D), insertion of the first fitting 901 of the filter capsule 900 into the lower end of the through hole will lead to the first fitting contacting the bottom end of the projection, compressing the spring and pushing the bottom end of the projection upwardly, opening the flow path, such that, when fluid is being filtered, the filtered fluid can pass through the first fitting, through the central opening and slots, and through the end of the through hole in the side wall (as represented by the arrow in FIG. 5).

Optionally, with reference to FIGS. 1B and 2A-2B, the slidable locking pin 177 is prevented from running out of locking pin opening 154A by retaining ring 178, and optional locating pin 177' is connected to locking pin 177 (e.g., by threads or a press-fit), wherein locating pin 177' provides end 177A and locking pin 177 can be slid through retaining ring 178 and end 177A can be slid into first opening 195A or second opening 195B. Alternatively, slidable locking pin 177 itself may have end 177A.

In the illustrated embodiment (e.g., as shown in FIGS. 1A-1C)), the lower frame arrangement 200 comprises a top wall 251 and a bottom wall 252 wherein the through hole 201 for receiving the second fitting 902 passes through the top wall and the bottom wall; a first side wall 253, a second side all 254, a front wall 255, and a rear wall 256.

In the illustrated embodiments (e.g., FIGS. 1A-1C), the manifold frame 300 has a front face 355 and a rear face 356 includes a washer 195 arranged in cavity 196 in the front face, wherein the washer has the first and second openings 195A, 195B; however, the washer is optional and the openings can be directly in face 355 the manifold frame.

The upper adjustable frame arrangement and the lower frame arrangement can be connected to the manifold frame as known in the art, e.g., by screws and/or bolts. In those embodiments wherein the top cover 151A is removable, the top cover is also secured to the body as is known in the art. FIG. 2B shows 4 retainers 159A, 159B, 159C, and 159D such as bolts and/or screws (or a press-fit).

As will be discussed in more detail below, each of the upper and lower frame arrangements is configured for receiving a filter capsule fitting, via the through hole 101 in the upper frame arrangement, and via the through hole 201 in the lower frame arrangement.

FIGS. 1A-1C show upper and lower connection port fittings 701 and 702, comprising, respectively, nuts 701A and 702A, hollow bodies 701B and 702B, first fitting fluid flow port 701C, and second fitting fluid flow port 702C. FIG. 6A shows lower connection port fitting 702 engaged with the lower frame arrangement 200. Typically, as shown in FIG. 6B, the hollow bodies and nuts include corresponding threads, and an end of a hollow body is configured to fit tightly into the interior diameter of a conduit (tubing; shown here with a flared end) such that the conduit can provide fluid communication with the manifold assembly when the nut is tightened on the threads of the hollow body. While not shown in the Figures, the hollow bodies can be attached to the frame arrangements as known in the art, e.g., by threads, press-fitting, etc.

A variety of connection port fittings are suitable for use in accordance with embodiments of the invention, and are known in the art.

In accordance with an embodiment of a method for engaging a filter capsule in a manifold assembly, and using FIGS. 7A-7D for reference (wherein the upper adjustable frame arrangement 100 of the manifold assembly is initially moved from the second position (FIG. 7A) to the first position (FIG. 7B)), a filter capsule 900 having a first fitting 901 and a second fitting 902 is placed into an embodiment of the manifold assembly, moving the filter capsule horizontally while kept vertically and the filter capsule is moved downwardly while kept vertically while the second fitting is placed in the through hole 201 (FIG. 7C).

Optionally, as shown in FIGS. 7B, and 7D, when the upper adjustable frame arrangement is locked in the first or second position, the handle face 171 will be in the same plane as block front wall 155. Thus, if the handle face is not in the same plane as the block front wall, the user will know that the locking pin is not in the first or second opening and the upper frame arrangement is not locked in position.

Upon moving the handle 175 horizontally to unlock the upper adjustable frame arrangement from the first position (FIG. 7C), the upper adjustable frame arrangement is moved downwardly to the second position, the first fitting is placed in through hole 101, and the handle is moved to lock the upper adjustable frame arrangement in the second position (FIG. 7D), and the first fitting contacts the check valve and opens the fluid flow path.

Accordingly, the filter capsule can be inserted into the manifold assembly and engaged without rotating the filter capsule.

Preferably, filter capsules can be installed in the manifold assembly and radial seals are formed between the first fitting and the first fitting fluid flow port and between the second fitting and a second fitting fluid flow port.

In those embodiments for use with a filter capsule having different configurations for the filter inlet fitting and the filter outlet fitting, the through holes can be sized such that the filter capsule can only be installed one way in the manifold assembly, ensuring the correct orientation of the filter capsule during use.

Fluid can be passed through the filter capsule to filter the fluid as the fluid passes through the porous filter medium. The filter capsule first fitting can be a filter inlet fitting or a filter outlet fitting. Typically, the filter capsule first fitting is an outlet fitting, such that, during filtration, the filtered fluid passes from the filter outlet fitting, and through the first fitting fluid flow port.

Once filtration is completed, the manifold can be placed in the first fitting disengagement position after moving the movable plate and the rotating the handle, and the filter capsule can be removed, and a new capsule inserted.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A manifold assembly for use with a filter capsule having a first fitting and a second fitting, the manifold assembly comprising: (a) an upper adjustable frame arrangement comprising a body, a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end, wherein the slidable locking pin can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening.

2. The manifold assembly of claim 1, wherein the check valve includes a projection that, when the check valve is biased closed, contacts a valve seat in lower end of the cavity in the upper adjustable frame arrangement.

3. The manifold assembly of claim 1, wherein the rear wall of the upper adjustable frame arrangement comprises a locking pin opening and a cavity for receiving a linear guide comprising a grooved plate, wherein the linear guide is mounted to the block and is arranged to guide the adjustable frame arrangement vertically between the first position and the second position; wherein the upper adjustable frame arrangement is movable along the linear guide between the first and the second positions when the locking pin end is not in the first opening or the second opening.

4. A method for engaging a filter capsule in a manifold assembly, the method comprising placing a filter capsule having a first fitting and a second fitting into a manifold assembly comprising: (a) an upper adjustable frame arrangement comprising a body, a block comprising a top wall, a bottom wall, a first side wall, a second side wall, a rear wall, a through hole for receiving the first fitting, the through hole passing through the bottom wall and the second side wall and providing a fluid flow path; a cavity within the body; a check valve located in the cavity and across the fluid flow path, the check valve opening to allow fluid flow along the fluid flow path when contacted by the first fitting, and biased closed to prevent fluid flow along the fluid flow path when not contacted by the first fitting; a slidable handle arranged on the first side wall; a slot in the first side wall; a slidable locking pin arranged in the block, the slidable locking pin having an end, wherein the slidable locking pin can be withdrawn into the block and extended from the block through the locking pin opening upon slidably moving the handle horizontally, wherein the slidable handle is connected to the slidable locking pin by at least one retainer passing through the slot in the first side wall, wherein the slidable handle can move the slidable locking pin to slide the locking pin end into a first opening to lock the upper adjustable frame arrangement in the first position, and to slide the locking pin end into a second opening to lock the upper adjustable frame arrangement in the second position, wherein the upper adjustable frame arrangement is movable between the first and the second positions when the locking pin end is not in the first opening or the second opening; (b) a lower frame arrangement comprising a through hole for receiving the second fitting; and, (c) a manifold frame connected to the upper adjustable frame arrangement and connected the lower frame arrangement, the manifold frame including the first opening and the second opening; the method including placing the second fitting into the through hole of the lower frame arrangement; moving the upper adjustable frame arrangement from the first position to the second position and placing the first fitting in the through hole of the upper adjustable frame arrangement such that the first fitting contacts the check valve and opens the check valve; and moving the movable handle to lock the upper adjustable frame arrangement in the second position.

5. The method of claim 4, further comprising passing fluid through the filter capsule.

6. The manifold assembly of claim 2, wherein the rear wall of the upper adjustable frame arrangement comprises a locking pin opening and a cavity for receiving a linear guide comprising a grooved plate, wherein the linear guide is mounted to the block and is arranged to guide the adjustable frame arrangement vertically between the first position and the second position; wherein the upper adjustable frame arrangement is movable along the linear guide between the first and the second positions when the locking pin end is not in the first opening or the second opening.

* * * * *